United States Patent
Balcezak et al.

(10) Patent No.: US 10,001,272 B2
(45) Date of Patent: Jun. 19, 2018

(54) APPARATUS AND METHOD FOR CLOSE COUPLING OF HEAT RECOVERY STEAM GENERATORS WITH GAS TURBINES

(75) Inventors: William C. Balcezak, Granby, CT (US); Wesley P. Bauver, II, Granville, MA (US); Robert Livermore, Wilbraham, MA (US); Ian J. Perrin, North Granby, CT (US); Aaron Yeaton, Middletown, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 504 days.

(21) Appl. No.: 12/850,108

(22) Filed: Aug. 4, 2010

(65) Prior Publication Data

US 2011/0048010 A1 Mar. 3, 2011

Related U.S. Application Data

(60) Provisional application No. 61/239,604, filed on Sep. 3, 2009.

(51) Int. Cl.
  *F01K 13/00* (2006.01)
  *F22B 1/18* (2006.01)
  (Continued)

(52) U.S. Cl.
  CPC .......... *F22B 1/1815* (2013.01); *F01D 25/30* (2013.01); *F02C 6/18* (2013.01); *F28D 7/1623* (2013.01);
  (Continued)

(58) Field of Classification Search
  USPC ..................... 122/7 R; 60/645, 694
  See application file for complete search history.

(56) References Cited

U.S. PATENT DOCUMENTS 2,968,147 A * 1/1961 Beckelman ............... F02C 7/04
  261/64.1
3,442,324 A * 5/1969 Clay, Jr. ................. F22B 1/1815
  122/7 R
(Continued)

FOREIGN PATENT DOCUMENTS

DE 19737507 3/1999
DE 19737507 A1 * 3/1999 ............ F01D 25/30
(Continued)

OTHER PUBLICATIONS

DE19737507 machine translation.*
(Continued)

*Primary Examiner* — Nathaniel Herzfeld
(74) *Attorney, Agent, or Firm* — GE Global Patent Operation; Stephen G. Midgley

(57) ABSTRACT

A heat recovery steam generator ("HRSG") 40, which is closely coupled to a gas turbine, includes a flow controls structural array 10 disposed upstream of the tubes 42 of the HRSG 40. The structural array 10 is formed of a plurality of grate-like panels 18 secured to horizontal supports 24 mounted to the support structure of the HRSG 40. The structural array 10 diffuses the high velocity exhaust stream 14 exiting the gas turbine and redistributes the gas flow evenly throughout the HRSG 40. The structural array 10 reduces wear and damage of the tubes 46.

26 Claims, 3 Drawing Sheets

(51) Int. Cl.
- *F01D 25/30* (2006.01)
- *F02C 6/18* (2006.01)
- *F28D 7/16* (2006.01)
- *F28F 9/02* (2006.01)
- *F28F 19/00* (2006.01)
- *F28D 21/00* (2006.01)

(52) U.S. Cl.
CPC ............ *F28F 9/028* (2013.01); *F28F 9/0263* (2013.01); *F28F 19/00* (2013.01); *F05D 2220/31* (2013.01); *F28D 21/0003* (2013.01); *F28F 2265/00* (2013.01)

(56) References Cited

U.S. PATENT DOCUMENTS

| | | | | |
|---|---|---|---|---|
| 4,427,058 A | * | 1/1984 | Bell et al. | 165/160 |
| 4,573,551 A | * | 3/1986 | Schwerdtner et al. | 181/218 |
| 5,431,009 A | * | 7/1995 | Bauver, II | 60/39.182 |
| 5,532,439 A | * | 7/1996 | Minkin | 181/224 |
| 5,555,718 A | | 9/1996 | Anderson et al. | |
| 5,946,901 A | * | 9/1999 | Bauver | F22B 1/1815 |
| | | | | 122/7 R |
| 6,340,002 B1 | * | 1/2002 | Liebig | 122/7 R |
| 6,453,852 B1 | * | 9/2002 | Lifshits et al. | 122/7 R |
| 6,919,050 B2 | * | 7/2005 | Hettwer et al. | 422/176 |
| 7,100,356 B2 | * | 9/2006 | Han et al. | 60/39.182 |
| 2003/0115817 A1 | * | 6/2003 | Blackwell et al. | 52/456 |
| 2007/0119388 A1 | * | 5/2007 | Waseda et al. | 122/7 R |
| 2009/0173072 A1 | * | 7/2009 | Mastronarde | 60/659 |
| 2010/0064655 A1 | * | 3/2010 | Zhang | F01K 23/101 |
| | | | | 60/39.5 |
| 2012/0279596 A1 | * | 11/2012 | Kramer et al. | 138/39 |

FOREIGN PATENT DOCUMENTS

| | | |
|---|---|---|
| EP | 0863364 | 9/1998 |
| JP | H08-121706 A | 5/1996 |
| RU | 2018047 C1 | 8/1994 |

OTHER PUBLICATIONS

Slotted bracket—note the date the product was added to the catalogue.*
DE19737507—machine translation.*
PCT International Search Report and the Written Opinion of the International Searching Authority dated Jun. 6, 2011—(PCT/US2010/044496).
Unofficial translation of Notice of Allowance issued from corresponding Russian Patent Application No. 2012112807 dated Mar. 2, 2017.
Unofficial Examination Report and Search issued in connection with corresponding AE Application No. P218/12 dated Jul. 24, 2017.

* cited by examiner

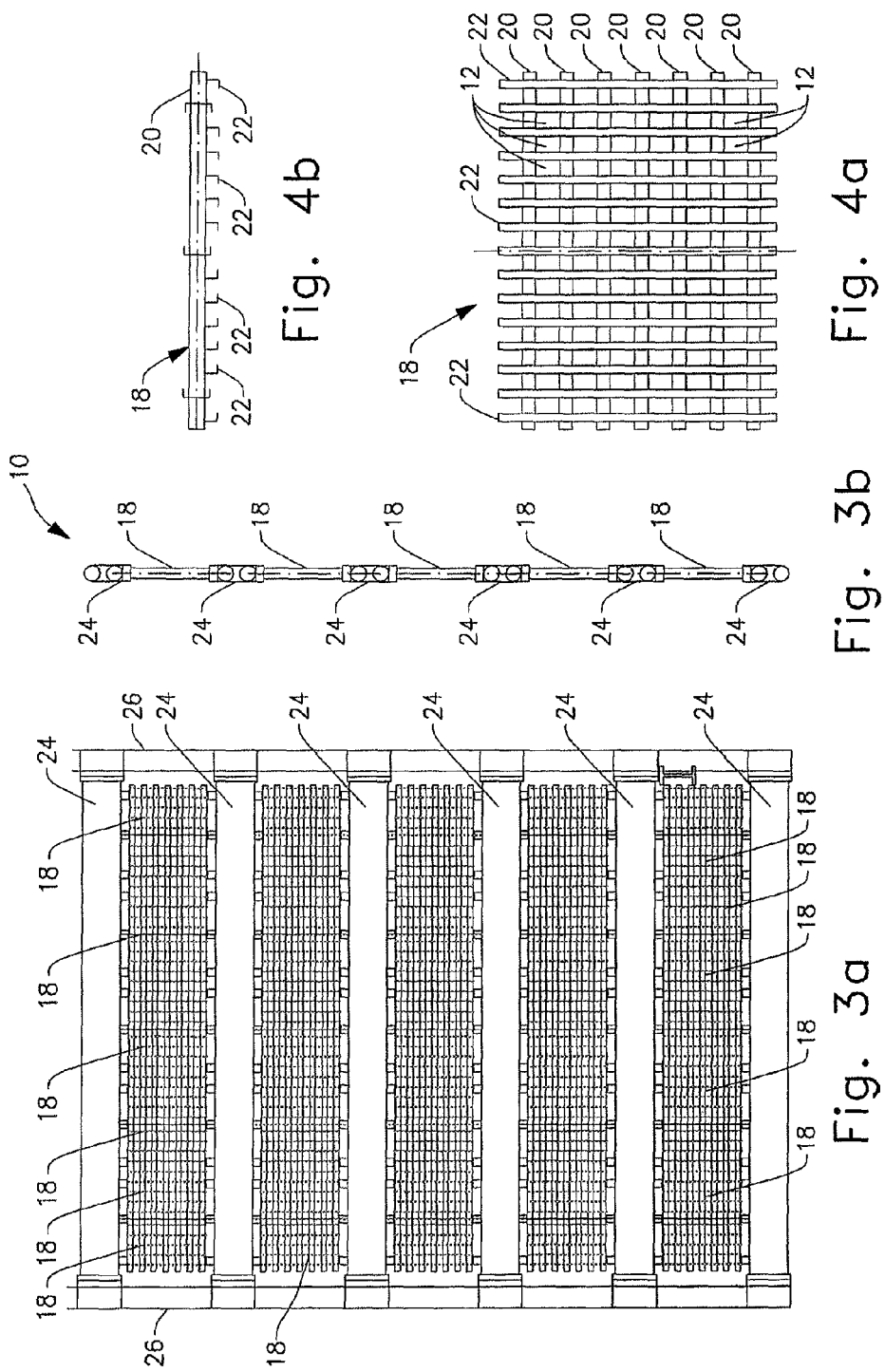

APPARATUS AND METHOD FOR CLOSE COUPLING OF HEAT RECOVERY STEAM GENERATORS WITH GAS TURBINES

TECHNICAL FIELD

The present invention relates generally to heat recovery steam generators (HRSGs), and more particularly, to a heat recovery steam generator having a structural array to control the exhaust flow exiting a gas turbine before passing through the heat recovery steam generator.

BACKGROUND

Combined Cycle power plants employ gas turbines with Heat Recovery Steam Generators (HRSGs) that use the thermal energy in the exhaust from gas turbines to generate steam for power generation or process use. The large stationary gas turbines used in such power plants may typically have average exhaust gas velocities in the range of 200 ft/sec. The velocity of the gas turbine exhaust is not uniform however and some recent gas turbines have local exhaust gas velocities in the range of 660 ft/sec. HRSGs may have flow areas in the range of 5 to 10 times the gas turbines exit flow area and thus average entering velocities that are 5 to 10 times lower than those exiting the gas turbine. A diverging duct is therefore required to connect the gas turbine to the HRSG. A typical arrangement of the gas turbine exhaust diffuser, connecting duct and HRSG is shown in FIG. 1. It is desirable to locate the HRSG close to the gas turbine in a compact duct arrangement to minimize the area required for the power plant and to minimize the size and cost of the connecting duct. This can result in a high velocity jet of gas impacting the region of the front rows of heat transfer tubes in the HRSG that are in line with the gas turbine exhaust diffuser. Such high velocities can cause flow-induced vibrations that will damage the heat transfer tubes. The high aerodynamic loading on the tube banks can also cause movement of the entire front tube bank resulting in damage to components in and around the tube bank. The non-uniform velocities entering the HRSG front tube rows also reduce the heat transfer effectiveness of these rows.

In some cases flow controls have been used in the diverging duct to redirect flow within the duct and improve flow distribution to the front rows of tubes in the HRSG. These flow controls would be subject to very high aerodynamic loadings in a compact duct due to close proximity to the gas turbine. In addition to the steady aerodynamic loading, the flow controls are subject to dynamic loading due to the high levels of turbulence in the duct and thermal stress due to going from ambient temperature to the high gas turbine exhaust temperature. These issues make it unlikely that flow controls located in the diverging duct 36 will survive long-term operation.

As will be described in greater detail hereinafter, a structural array disposed upstream of the front tubes of an HRSG will overcome such problems, particularly when the turbine and HRSG are closely coupled.

Currently there is a need for an effective and reliable means for diffusing an exhaust stream 14 from a turbine to recover heat.

BRIEF DESCRIPTION OF THE DRAWINGS

Referring now to the Figures, which are exemplary embodiments, and wherein the like elements are numbered alike:

FIG. 3a is a front view of the HRSG having a structural array secured thereto in accordance to the present invention.

FIG. 3b is a side elevation view of the structural array of FIG. 3a.

FIG. 4a is a front view of a grate-like panel of the structural array of FIG. 3a.

FIG. 4b is a side elevation view of the grate-like panel of FIG. 4a.

DETAILED DESCRIPTION

A new approach to flow controls is suggested in which an array 10 of structural components is placed in front of the front row of tubes 48 to diffuse the high velocity exhaust stream 14 exiting the gas turbine (not shown) and redistribute the gas flow into the HRSG 40. One such arrangement is shown in FIGS. 2-4b. Note that these figures show one possible arrangement. Other combinations could be used as long as the features discussed below are met by the design.

Figure 1:
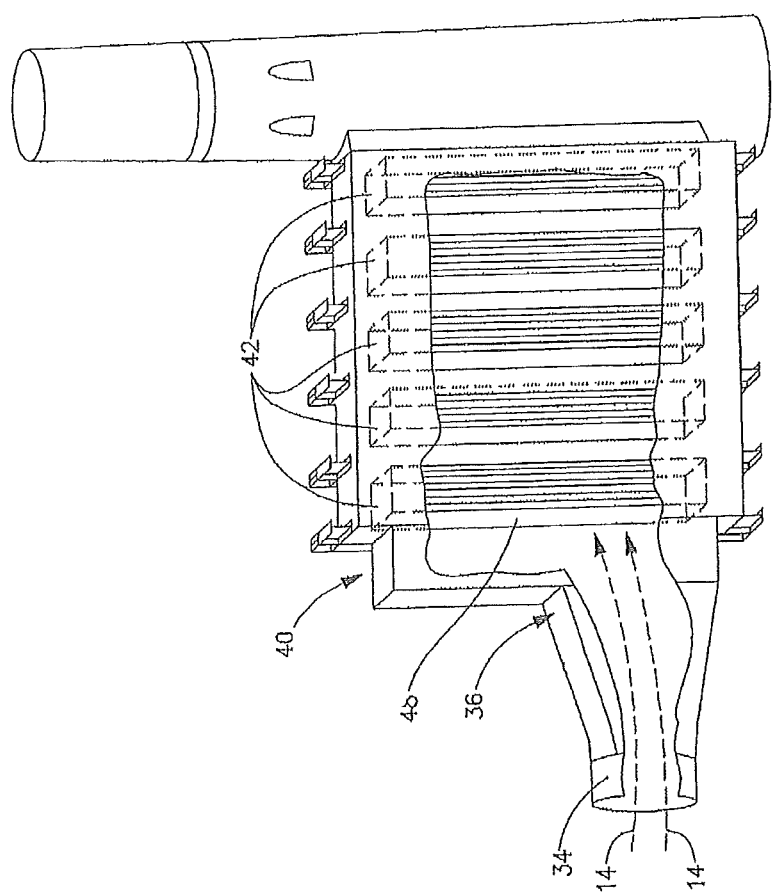
FIG. 1 is a partial cut-away side elevation view of an HRSG coupled in fluid communication with a gas turbine exhaust diffuser and an HRSG in accordance with the present invention.
Figure 2:
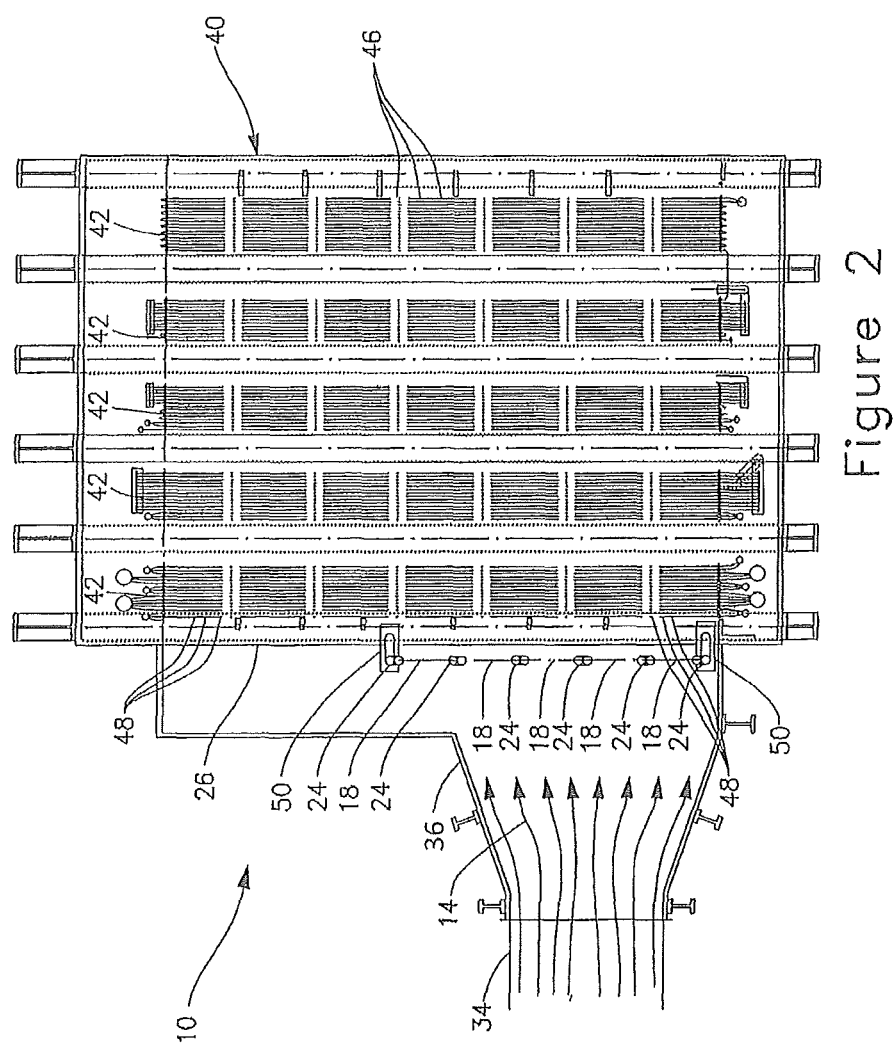
FIG. 2 is a cross-sectional side elevation view of an HRSG having an inlet duct and a structural array disposed upstream of the tubes of the HRSG in accordance with the present invention.

FIG. 2 is a cross-sectional side elevation view of an HRSG having an inlet duct and a structural array disposed upstream of the tubes of the HRSG in accordance with the present invention. FIG. 2 illustrates an HRSG 40 with a structural array 10.

FIG. 3a is a front view of the HRSG having a structural array secured thereto in accordance to the present invention.

FIG. 3b is a side elevation view of the structural array of FIG. 3a.

With reference now to FIGS. 2, 3a and 3b, structural array 10 is disposed upstream of the tube banks 42 of the HRSG 40. The structural array 10 is mounted or secured to structural elements or supports 26 at the upstream end of the HRSG 40 to control the flow of the exhaust stream 14 from a turbine (not shown), e.g., a gas turbine. As shown in FIG. 3a, the structural array 10 extends over the upstream end of the HRSG 40 over a sufficient area to engage or control the exhaust stream 14.

In the embodiment shown, the structural array 10 comprises a plurality of grate-like panels 18.

FIG. 4a is a front view of a grate-like panel of the structural array of FIG. 3a.

FIG. 4b is a side elevation view of the grate-like panel of FIG. 4a.

Panels 18 are now described with reference to FIGS. 4a and 4b. Panels 18 each have a plurality of horizontal bars 20 connected to a plurality of vertical bars 22. The bars 20, 22 may be solid, hollow or generally U-shaped. Furthermore, the cross section of each bar may be any geometric shape (i.e., round, oval, square, rectangular, octagonal, etc.) or U-shaped. The grid openings 12 may be uniform or irregular. Similarly, the spacing of the vertical and horizontal bars of the array may be uniform or varied. The vertical bars 22 of the panel 18 are U-shaped, wherein the orientation of the U-shaped bars are such that the openings of the bars open inwardly towards the center of the panel. While the U-shaped vertical bars 22 are shown in such an orientation, the invention contemplates that the U-shaped bars may be disposed in any orientation.

Each of the panels 18 are mounted or secured (e.g., welded, bolted, or other means of attachment) to horizontal supports 24, which are in turn attach or secured to structural supports 26 of the HRSG 40. The mounting of the panels 18 to the structural supports 26 and not the tubes 46 of the HRSG reduce fatigue on the tubes. In the embodiment shown the horizontal supports 24 are formed of a pair of vertically disposed tubes 30 are welded together. However, the present invention contemplates that the horizontal supports 24 may be formed from any support bean.

Referring now back to FIG. 2, in the operation of the gas turbine (not shown) and the HRSG 40 with the flow control structural array 10, the exhaust stream 14 from the gas turbine flows through the connecting duct 34 and HRSG inlet duct 36. The high velocity flow passes through the grate-like structural array 10, wherein the exhaust stream 14 is diffused and further distributed across the tubes 46 of the HRSG 40.

The structural array 10 is constructed of structural components 20, 22, 24 to withstand the forces imparted by the high velocity exhaust stream 14. Pined and/or slip connections are used where appropriate to allow for thermal expansion. The size and spacing of the components 20, 22, 24 is arranged to provide sufficient resistance to redirect part of the high velocity exhaust stream 14 to the sections of the front row tubes 48 that would have had little or no gas flow, improving the distribution of gas flow into the HRSG 40. The structural components 20, 22, 24 are also sized and spaced such that the remaining flow passing though the array 10 is distributed through grid openings 12 into a large number of smaller jets. The smaller jets start with a diameter D the same as the grid openings 12. These are on the order of $1/10$ of the distance from the structural array 10 to the tubes 46. This allows the small multiple jets to partially dissipate before reaching the tubes 46 and lowers the loading on the region of the tubes that would have been subjected to unacceptable velocities without the structural array 10.

The extent of the front row of tubes 46 that are protected by the structural array 10 and the diameter of the grid openings 12 will be based on physical flow modeling of the specific gas turbine and HRSG 40.

In an alternative embodiment, structural array 10 is on adjustable mounts (50 of FIG. 2) such that the distance from the structural array and tubes 46 may be adjusted. This allows for adjustment of more or less dissipation of the exhaust jets as they impinge upon the tubes 46. Since more diffusion of the exhaust stream 14 result in higher exhaust back pressure, the system can be interactively optimized for both backpressure and diffusion.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat recovery steam generator for receiving an exhaust stream from a turbine, the heat recovery steam generator comprising:

a chamber having a plurality of tubes disposed therein;

an inlet duct in fluid communication with the chamber having a diverging profile and extending upstream from the chamber to provide the exhaust stream from the turbine through the inlet duct to the chamber; and a grate-like structural array, disposed within the chamber, downstream of and spaced from the inlet duct and upstream of the plurality of tubes, the structural array including at least one grate-like panel having a plurality of grid openings, wherein the at least one grate-like structural array is sized and disposed to dissipate the energy of the entire portion of the exhaust stream exiting the inlet duct to reduce the aerodynamic loading exerted on the plurality of tubes by the exhaust stream, wherein the surface between the grid openings provides resistance to redirect a portion of the exhaust stream around the grate-like structural array to distribute the portion of the exhaust stream to other sections of the tubes, and wherein the grid openings are sized to pass the remaining portion of the exhaust stream through the grid openings.

2. The heat recovery steam generator of claim 1 wherein the inlet duct provides the exhaust stream directly only to the lower portion of the chamber.

3. The heat recovery steam generator of claim 1 further comprising structural supports disposed within the chamber, wherein the grate-like structural array is secured to the structural supports.

4. The heat recovery steam generator of claim 1 wherein the grid openings are disposed over the entire surface of the at least one grate-like panel and are sized and spaced to provide a surface thereon to absorb the aerodynamic loading of the exhaust stream.

5. The heat recovery steam generator of claim 1 wherein the at least one grate-like panel comprises a first set of bars extending in one direction and a second set of bars extending in a second direction to form the grid openings.

6. The heat recovery steam generator of claim 5 wherein the first set of bars extend generally horizontally and the second set of bars extend generally vertically.

7. The heat recovery steam generator of claim 5 wherein one of the first set of bars are disposed upstream of the second set of bars or the second set of bars are disposed upstream of the first set of bars.

8. The heat recovery steam generator of claim 5 wherein at least one of the first and second set of bars have a rectangular cross-section.

9. The heat recovery steam generator of claim 5 wherein at least one of the first and second set of bars have a U-shaped cross-section.

10. The heat recovery steam generator of claim 1 wherein the at least one grate-like panel includes a plurality of grate-like panels.

11. The heat recovery steam generator of claim 10 wherein each of the grate-like panels extend in a plurality of spaced horizontal rows.

12. The heat recovery steam generator of claim 11 further comprising at least one horizontal support disposed between the grate-like panels to secure the grate-like panels together.

13. The heat recovery steam generator of claim 12 wherein the horizontal support and grate-like panels are attached by pinned and/or slip connections to allow thermal expansion.

14. The heat recovery steam generator of claim 1 wherein the exhaust stream passing through the grate-like structural array form a plurality of jets having a diameter of approximately $1/10$ of the spacing between the grate-like structural array and the tubes.

15. The heat recovery steam generator of claim 3 wherein the grate-like structural array is adjustably secured to the structural supports to permit the distance between the grate-like structural array and the tubes to be varied.

16. The heat recovery steam generator of claim 15 further includes adjustable mounts interconnecting the grate-like structural array and the structural supports to vary the distance between the grate-like structural array and the tubes.

17. The heat recovery steam generator of claim 1 wherein the grate-like structural array is sized to engage the exhaust stream prior to passing through the tubes and permitting the remaining portion of the exhaust stream to pass around the grate-like structural array to the tubes to thereby prevent the any of the exhaust gas from directly contacting the tubes.

18. The heat recovery steam generator of claim 1 wherein the turbine and the chamber are closely coupled such that direct exposure of the tubes to the exhaust stream would result in damage to the tubes.

19. The heat recovery steam generator of claim 1, wherein the inlet duct includes an inlet and an outlet, and the grate-like structural array having a cross-sectional area greater than the cross-sectional area of the outlet of the inlet duct.

20. The heat recovery steam generator of claim 1, wherein the inlet duct is conically shaped.

21. The heat recovery steam generator of claim 1, further comprising structural supports disposed within the chamber, and wherein the grate-like structural array is secured to the structural supports.

22. The heat recovery steam generator of claim 1, wherein the grate-like structural array extends over and is disposed upstream of only a lower portion of the tubes.

23. The heat recovery steam generator of claim 19, wherein the grate-like structural array is disposed across the entire portion of the tubes to prevent direct contact of the exhaust stream with the tubes.

24. The heat recovery steam generator of claim 12, wherein the at least one horizontal support includes a panel that provides a surface sized to provide sufficient resistance to redirect a portion of the exhaust stream above the grate-like structural array.

25. A heat recovery steam generator for receiving an exhaust stream from a turbine, the heat recovery steam generator comprising:
    a chamber having a plurality of tubes disposed therein;
    an inlet duct having a diverging profile and having an inlet and an outlet, the inlet duct in fluid communication with the chamber and extending upstream from the chamber to provide the exhaust stream from the turbine through the inlet duct to the chamber; and
    a grate-like structural array, disposed within the chamber, downstream of and spaced from the inlet duct and upstream of and spaced from the plurality of tubes, the structural array including at least one grate-like panel having a plurality of grid openings, wherein the at least one grate-like structural array has a cross-sectional area at least as large as a cross-sectional area of the outlet of the inlet duct and disposed to extent before the entire portion of the outlet of the inlet duct to reduce the aerodynamic loading exerted on the plurality of tubes by the exhaust stream, wherein the surface between the grid openings provides resistance to redirect a portion of the exhaust stream around the grate-like structural array to distribute the portion of the exhaust stream to other sections of the tubes, and wherein the grid openings are sized to pass the remaining portion of the exhaust stream through the grid openings.

26. The heat recovery steam generator of claim 1 wherein the plurality of grid openings are substantially uniform in size.

* * * * *